United States Patent Office 3,198,620
Patented Aug. 3, 1965

3,198,620
SYNTHETIC TOPSOIL COMPOSITION CONTAINING CHELATE-PRODUCING MATERIAL
John D. Larson, P.O. Box 162, Hinsdale, Ill.
No Drawing. Filed May 16, 1962, Ser. No. 195,311
4 Claims. (Cl. 71—1)

The present invention relates to the production of a novel synthetic topsoil of the constituents embodied in my Patent No. 2,797,985, of July 2, 1957, entitled, "Method of Producing Synthetic Topsoil," together with a chelate-producing material, and more particularly to the treatment of such synthetic topsoil with an effective mixture of a novel chelate-producing material for stabilizing the inorganic materials to effect a resistance to micro-organisms and fungus diseases in crops when applied to the synthetic topsoil.

Among the objects of the present invention is to provide synthetically a topsoil and process of making the same in a relatively short period of time, such soil prepared from a composition of various raw earth materials producing a soil of unusually high fertility and capable of use for growing agricultural crops, such ingredients being required for proper and healthy plant growth and of such character and condition that the elements required for plant food and growth are immediately and continuously available to the plants.

The present invention further comprehends a novel synthetic topsoil in which the so-called inorganic mineral elements and their compounds are in such form and character so as to be continuously available.

The bulk of most soils is composed of inorganic mineral elements in a raw state relatively unavailable for use by plant life, except after long periods of disintegration, recombination, and other "conditioning" by the forces and processes of nature. The mere fact that a given soil may contain potentially available quantities of a vital element or compound such as potassium or phosphoric acid, does not, in and of itself, establish a criterion for the fertility of the soil or the availability of such element or compound for plant use. Unless the soil constituents needed by the plant are of such nature and in such condition that they may be utilized by plant life, they might just as well not be present at all; they will remain wholly inert and useless, being of value only to provide bulk for stability and other purely mechanical purposes. For these reasons, many soils potentially rich in food elements may produce unsatisfactory or barren results.

The synthetic topsoil produced according to my above patent contains some fifteen primary nutrient elements of calcium, carbon, chlorine, fluorine, hydrogen, iron, magnesium, manganese, nitrogen, oxygen, phosphorous, potassium, silicon, sodium and sulphur, together with a trace of micro-elements of cobalt, chromium, molybdenum, titanium, vanadium, copper, boron, tin, silver, zinc and possibly others.

The foregoing elements do not exist in the free or chemically uncombined state, but will be found in the raw materials or in the final product in combinations including the phosphates, sulphates, carbonates, silicates and chlorides of various of the elements.

It has been found that empirical or indiscriminate use of such trace elements in fertilizers has often resulted in toxic effects upon plants from application of merely a slight excess of the micro-element. My research has revealed new facts and more precise data involving the biochemistry of my synthetic topsoil and from research on growing crops that the fact of availability, per se, of primary plant nutrients is not necessarily a guarantee of plant resistance to attack by fungus and virus diseases, or by predatory pests. These new facts and more precise data emphasize the importance of critical proportion of primary soil elements as the factor important to the prevention of attack by plant enemies.

The importance of trace elements has been recognized, with the result that fertilizer producers have included them in their fertilizer formulae for spreading on the soil. The indiscriminate use of such trace elements has, however, been discouraged by the fact that toxic effects resulted from the application to the land of a slight excess of a trace element, even as low as a pound or two per acre. The danger of toxic effects resulting from the employment of such trace elements is entirely obviated when synthetic topsoil produced in accordance with my novel method of my above mentioned Patent No. 2,797,985 is applied to the land as a top dressing or is plowed under.

In addition to the primary and trace elements employed in my process, there are utilized in the process either by the addition thereto or by the natural production in carrying out the process, many organic acids such as humic, ulmic, crenic, and apocrenic, etc., which combining with the minerals employed form colloidal compounds which persist in the end product or are converted during the process into other chemical constituents.

While synthetic topsoil may be produced by various combinations of the basic ingredients and by such ingredients in various forms and while the processing may be varied within reasonable limits, it is most desirable that these ingredients and their condition, both physical and chemical, and the manner by which they are combined and processed, be such as to give optimum results in quality and period of preparation and maturity. To this end the fundamental technique employs the following materials:

(1) Pulverized igneous rock such as granite, gneiss, feldspars, or volcanic ash;

(2) Pulverized sedimentary rock such as phosphate rock, limestone, dolomite, marl or air slaked lime;

(3) Pulverized and, preferably hydrous calcium sulphate as gypsum or land plaster, or glauberite $$(Na_2SO_4.CaSO_4)$$

(4) Powdered clay (basically hydrous aluminum silicates but normally carrying other compounds such as compounds of iron, potassium, magnesium, etc.);

(5) Organic materials of the character of peat, lignin, sawdust and wood shavings, wood and cannery waste matter, castor bean hulls and tung nut shells;

(6) Organic material of the character of horse manure or sludge from sewage disposal or treatment plants.

For the past century it has been widely accepted that the basis of good crop yield, with resistance to fungus and virus disease, and to pest attack, was to be found in an optimum proportion of nitrogen, phosphate and potash.

In contrast, the new facts and more precise data on the biochemistry of plant metabolism reveal that susceptibility to fungus disease, in particular, is associated with such optimum proportion of phosphate as envisaged by tradition and, in addition, where the new facts disclose there is a deficiency of sulphates. In short, these newly discovered data point up the factor of critical proportions of nutrients.

A typical example of such critical proportions is exhibited in the analysis of the dry-rot-of-wood fungus, Merulius lachrymans. Here are found from five to six percent of phosphate, but merely a trace of sulphate, in contrast to the analysis of healthy wood, showing approximately one-half percent of phosphate, or less, but a total of one percent of sulphate. Thus, the fungus has from ten to twelve times or more as much phosphate as is present in healthy wood, with an analogous deficiency of sulphate as found in intact wood fibre.

Again, the fungus disease of rye, other cereals, and wild grasses, popularly known as ergot, Claviceps purpurea, contains some seven percent of phosphate, and no more than a trace of sulphate, as against approximately a maximum of one-half percent phosphate in the healthy grain. This emphasizes the critical proportion aspect of plant metabolism, in relation to equilibrium of soil nutrients.

Further, late potato blight, Phytophthera infestans, is another fungus disease that points up the factor of critical proportions of nutrients both in topsoil and in plant metabolism as a preventive of attack by this fungus. In the topsoil there is base exchange reaction between calcium sulphate and magnesium phosphate, whereby calcium phosphate and magnesium sulphate are taken up by the plant, and incorporated in the metabolic processes of the vine. It is proverbial that Phytophthera infestans occurs only during cool, cloudy, humid weather, and this is explained, in part by the fact that magnesium sulphate is by far the most soluble of metabolic compounds.

The mechanism of potato late blight, Phytophthera infestans formation, may be seen from the fact that when calcium phosphate reaches the leaves of the potato vines, it is absorbed intact by the process of metabolism in virtue of its stability and difficult solubility. In contrast, the labile or instable magnesium sulphate, during such humid weather as invariably accompanied potato late blight, undergoes solution and a portion escapes through guard cells in the stomata of the leaves of the potato vine. Through osmosis the magnesium sulphate migrates out of the potato plant, leaving an excess of calcium phosphate within the vine structure, thus becoming the source for susceptibility to the Phytophthera infestans fungus, or potato late blight.

My research has revealed the biologic mechanism involved in precluding the migration, by osmosis, of magnesium sulphate and other sulphate compounds, thus rendering these labile compounds more stable, and as a factor in preventing the occurrence of potato late blight and other fungus diseases of vegetation.

Discovery of the biologic mechanism involved in thwarting the attack by fungus and virus diseases, has pin pointed the biochemistry role of the chelate, a type of chemical compound in which an inorganic mineral atom is firmly combined with an organic molecule by multiple chemical bonds.

Derived from the Greek word, chela, or "claw," a chelate indicates an intensive hold by an organic molecule upon a metallic atom. In my experience with the control and/or eradication of fungus diseases of crops, I find that organo-metallic sulphate compounds are held together with such tenacity by extraordinary, strong multiple bonds that the sulphate does not leach away, or migrate out of the plant by osmosis during period of high humidity.

The experiences demonstrate definitely that by reason of the chelate compounds introduced into my synthetic topsoil, an unfavorable environment for fungus development is produced.

I have found that by the addition of such chelate-producing materials as soybean flour or corn flour, powdered baker's yeast and powdered milk, the citrates, oxalates, tartrates, malates and galacturnates thus produced, have resulted in a stabilizing influence upon all inorganic materials, preventing decomposition under hydrolytic attack in all kinds of soils, and exhibiting a definite resistance to attack by micro-organisms.

Although water-soluble, a chelate does not become fixed when in contact with soil colloids. Moreover, research has shown that the chelating agent is available to vegetation both at the root surface and after it enters into metabolic processes of the plant.

I have found that an effective mixture of chelate-producing materials consists of 25 to 75 pounds of soybean flour or corn flour, either alone or in combination, 1 to 3 pounds of dried milk and 1 to 3 pounds of powdered baker's yeast, when added to 1 ton of the ingredients for making my synthetic topsoil as set forth in detail in my United States Patent No. 2,797,985. Excellent results have been obtained by the use of a mixture of chelate-producing materials consisting of approximately 50 pounds of soybean flour or corn flour, approximately 2 pounds of dried milk and approximately 2 pounds of powdered baker's yeast combined and thoroughly mixed with approximately 1 ton of the ingredients for making my synthetic topsoil, such consisting of approximately granite 2 parts, limestone 2 parts, clay 2 parts, and gypsum 1 part with approximately two and one-half times its weight of organic material consisting of peat 8 parts, horse manure 4 parts, and sewage sludge 7 parts, inducing fermentation in the mass by adding thereto a catalyzer such as potato yeast culture and hippuric acid, promoting the oxidation of the cellulose components by aerating the mass and agitating the mass until the constituents are thoroughly decomposed into a homogeneous flocculent product embodying in a condition immediaely available for assimilation by growing plants those ingredients requisite for the production and sustaining of plant life.

From the above disclosure it will be appreciated that the present invention comprehends production of a topsoil to which has been added a novel chelating agent or chelate-producing material resulting in a stabilizing or activating influence upon inorganic materials, preventing decomposition under hydrolytic attack in various kinds of soils, and exhibiting a marked resistance to attack by micro-organisms.

Having thus disclosed my invention, I claim:

1. A composition of a synthetic topsoil comprising an inorganic material consisting of granite, limestone, clay and gypsum with approximately two and one-half times its weight of organic material consisting of peat, horse manure and sewage sludge and a catalyzer consisting of potato yeast culture and hippuric acid, and a chelate-producing material added to said synthetic topsoil consisting of a mixture of 1 to 3 pounds of powdered milk, 1 to 3 pounds of powdered baker's yeast, and 25 to 75 pounds of a compound selected from the group consisting of soybean flour and corn flour, added to 2000 pounds of the ingredients of the synthetic topsoil.

2. A composition of a synthetic topsoil comprising an inorganic material consisting of approximately 2 parts granite, 2 parts limestone, 2 parts clay and 1 part gypsum with approximately two and one-half times its weight of an organic material consisting of approximately 8 parts peat, 4 parts manure, and 7 parts sewage sludge, and a catalyzer consisting of potato yeast culture and hippuric acid, and a chelate-producing material consisting of 1 to 3 pounds of powdered milk, 1 to 3 pounds of powdered baker's yeast and 25 to 75 pounds of a compound selected from the group consisting of soybean flour and corn flour, added to 2000 pounds of the ingredients of the synthetic topsoil.

3. A composition of a synthetic topsoil comprising an inorganic material consisting of approximately 2 parts granite, 2 parts limestone, 2 parts clay and 1 part gypsum with approximately two and one-half times its weight of an organic material consisting of approximately 8 parts peat, 4 parts horse manure, and 7 parts sewage sludge, and a catalyzer consisting of potato yeast culture and hippuric acid, and a chelate-producing material consisting of approximately the proportions of 50 pounds of soybean flour, 2 pounds of powdered milk and 2 pounds of powdered baker's yeast added to 2000 pounds of the ingredients of the synthetic topsoil.

4. A composition of a synthetic topsoil comprising an inorganic material consisting of approximately 2 parts granite, 2 parts limestone, 2 parts clay and 1 part gypsum with approximately two and one-half times its weight of an organic material consisting of approximately 8 parts peat, 4 parts horse manure, and 7 parts sewage sludge, and a catalyzer consisting of potato yeast culture and hippuric acid, and a chelate-producing material consisting of approximately the proportions of 50 pounds of corn flour, 2 pounds of powdered milk and 2 pounds of powdered baker's yeast added to 2000 pounds of the ingredients of the synthetic topsoil.

References Cited by the Examiner
UNITED STATES PATENTS

| | | | |
|---|---|---|---|
| 2,741,551 | 4/56 | Daline | 71—23 |
| 2,797,985 | 7/57 | Larson | 71—8 |
| 2,827,368 | 3/58 | Mortenson et al. | 71—11 |
| 2,828,182 | 3/58 | Cheronis | 71—11 |
| 2,833,640 | 5/58 | Bersworth | 71—1.5 |

DONALL H. SYLVESTER, *Primary Examiner.*

ANTHONY SCIAMANNA, *Examiner.*